(12) United States Patent
Yang et al.

(10) Patent No.: US 12,564,799 B2
(45) Date of Patent: Mar. 3, 2026

(54) FILTER PLATE HANDLE AND FILTER PLATE FOR FILTER PRESS

(71) Applicant: JINGJIN EQUIPMENT INC., Dezhou (CN)

(72) Inventors: Mingjie Yang, Dezhou (CN); Guozhi Liu, Dezhou (CN); Xuegang Zhang, Dezhou (CN); Xin Wang, Dezhou (CN)

(73) Assignee: JINGJIN EQUIPMENT INC., Dezhou (CN)

( * ) Notice: Subject to any disclaimer, the term of this patent is extended or adjusted under 35 U.S.C. 154(b) by 366 days.

(21) Appl. No.: 18/020,424

(22) PCT Filed: Sep. 28, 2022

(86) PCT No.: PCT/CN2022/121997
§ 371 (c)(1),
(2) Date: Feb. 8, 2023

(87) PCT Pub. No.: WO2023/221362
PCT Pub. Date: Nov. 23, 2023

(65) Prior Publication Data
US 2024/0252958 A1 Aug. 1, 2024

(30) Foreign Application Priority Data

May 17, 2022 (CN) .......................... 202210534975.7

(51) Int. Cl.
*B01D 25/12* (2006.01)
(52) U.S. Cl.
CPC .................................... *B01D 25/12* (2013.01)
(58) Field of Classification Search
None
See application file for complete search history.

(56) References Cited

U.S. PATENT DOCUMENTS

| | | | | |
|---|---|---|---|---|
| 3,648,841 A | * | 3/1972 | Schotten .............. | B01D 25/172 |
| | | | | 210/224 |
| 2014/0299534 A1 | * | 10/2014 | Neumann ............ | B01D 25/164 |
| | | | | 29/428 |

FOREIGN PATENT DOCUMENTS

| | | | |
|---|---|---|---|
| CN | 2617453 Y | * | 5/2004 |
| CN | 2910323 Y | | 6/2007 |

(Continued)

OTHER PUBLICATIONS

International Search Report and Written Opinion of the International Searching Authority issued on Feb. 10, 2023 for PCT/CN2022/121997.

(Continued)

*Primary Examiner* — Bradley R Spies
*Assistant Examiner* — Jeannie McDermott
(74) *Attorney, Agent, or Firm* — Yue (Robert) Xu; Apex Attorneys at Law, LLP

(57) ABSTRACT

A filter plate handle is provided, an insertion shaft of which protrudes out of two side plate surfaces of a fixed plate, and the insertion shaft is fixedly connected to the fixed plate, portions protruding out of the two sides of the fixed plate are a first section and a second section respectively, the first section of the insertion shaft can be inserted into an insertion hole of a filter plate by interference fit, so as to ensure accurate alignment and assembly with the filter plate. The second section of the insertion shaft is provided with a wear-resistant block, which is configured to be in contact with a main beam and provide sliding support. The fixed plate is provided with at least two bolt holes and is fixedly connected to the filter plate by at least two bolts, so as to further realize fastening.

9 Claims, 4 Drawing Sheets

(56)              References Cited

FOREIGN PATENT DOCUMENTS

| | | | | |
|---|---|---|---|---|
| CN | 203556171 | U | * | 4/2014 |
| CN | 106246678 | A | | 12/2016 |
| CN | 108547835 | A | | 9/2018 |
| CN | 208330914 | U | | 1/2019 |
| CN | 209790973 | U | | 12/2019 |
| CN | 210057500 | U | | 2/2020 |
| CN | 211486684 | U | * | 9/2020 |
| CN | 212262497 | U | | 1/2021 |
| CN | 113267418 | A | | 8/2021 |
| CN | 214913700 | U | | 11/2021 |
| CN | 216418438 | U | | 5/2022 |
| CN | 114748898 | A | | 7/2022 |
| CN | 217367299 | U | | 9/2022 |
| DE | 19905674 | C1 | | 3/2000 |
| DE | 102007014341 | A1 | | 11/2007 |
| JP | S5768299 | A | | 4/1982 |
| JP | H0678380 | U | | 11/1994 |
| JP | 2005066413 | A | | 3/2005 |

OTHER PUBLICATIONS

The Japanese 1st Office Action issued on Oct. 29, 2024 for JP2023-512683.
The 1st Office Action dated May 31, 2025 for the Chinese Patent Application No. CN202210534975.7. English Translation of the 1st Office Action.
The European search report issued on Jan. 22, 2026 for EP22854454.0.

* cited by examiner

FILTER PLATE HANDLE AND FILTER PLATE FOR FILTER PRESS

This disclosure is a national phase application of PCT international patent application PCT/CN2022/121997, filed on Sep. 28, 2022 which claims the priority to Chinese Patent Application No. 202210534975.7, titled "FILTER PLATE HANDLE AND FILTER PLATE FOR FILTER PRESS", filed with the China National Intellectual Property Administration on May 17, 2022, the entire disclosure of which are incorporated herein by reference.

FIELD

The present disclosure relates to the field of filter presses, and in particular to a filter plate handle. In addition, the present disclosure also relates to a filter plate for a filter press.

BACKGROUND

A filter plate is a main filtering element of a filter press, filter plate handles are mounted on two sides of the filter respectively, main beams on the two sides are provided to support the filter plate handles on the two sides of the filter plate, and multiple filter plates are arranged on the main beams. A plate puller of the filter press pulls the filter plates so as to move the filter plates along the main beams.

The conventional filter plate handle is made by splicing two plate-shape structures which are perpendicular to each other, and one plate is fixed to a side surface of the filter plate by two or three bolts. Due to the clearance of the bolt holes, the mounted handles on the two sides cannot be accurately aligned, which may cause the filter plate handles to waggle relative to the filter plate.

For those skilled in the art, how to ensure an accurate alignment and mount of the handles on the two sides of the filter plate is a technical problem to be solved at present.

SUMMARY

A filter plate handle is provided according to the present disclosure, which solves the problem that the filter plate handle cannot be accurately aligned and mounted, and the specific solution is as follows:

a handle of a filter plate, includes a fixed plate and an insertion shaft that are relatively fixed, the insertion shaft protrudes out of two side plate surfaces of the fixed plate respectively, a first section of the insertion plate is inserted into an insertion hole of the filter plate by interference fit: a second section of the insertion shaft is provided with a wear-resistant block, and the wear-resistant block is configured to be in contact with a main beam; and the fixed plate is provided with at least two bolt holes and is fixedly connected to the filter plate by the at least two bolts.

In an embodiment, the insertion shaft is a stepped shaft, and an outer diameter of the stepped shaft decreases in a stepped shape from the middle to two ends respectively.

In an embodiment, the insertion shaft includes a first stepped section and a second stepped section, the second stepped section is in inserting connection with the fixed plate by interference fit, and the first stepped section is inserted into the filter plate by interference fit.

In an embodiment, the insertion shaft includes a third stepped section, and the third stepped section is configured to cooperate with a plate puller.

In an embodiment, the third stepped section is in a shape of a cylinder or a cuboid.

In an embodiment, the wear-resistant block is hinged to a main body section of the insertion shaft.

In an embodiment, at least two grooves are defined on an outer circumference of the insertion shaft, a retaining ring is clamped on each groove, and the retaining ring is configured to limit the wear-resistant block axially.

In an embodiment, the fixed plate is a metal plate, and the insertion shaft is a metal shaft.

A filter plate for a filter press is provided according to the present disclosure, which includes the filter plate handle according to any one of the above.

The filter plate handle is provided according to the present disclosure, the insertion shaft protrudes out of the two side plate surfaces of the fixed plate, the insertion shaft is fixedly connected to the fixed plate, the portions protruding out of the two sides of the fixed plate are the first section and the second section respectively, and the first section of the insertion shaft is able to be inserted into the insertion hole of the filter plate by interference fit, so as to ensure accurate alignment with the filter plate; the second section of the insertion shaft is provided with the wear-resistant block, the wear-resistant block is configured to be in contact with the main beam, and sliding support is provided by the wear-resistant block; the fixed plate is provided with at least two bolt holes and is fixedly connected to the filter plate by the at least two bolts, so as to further realize fastening; the filter plate handle according to the present disclosure realizes the primary fixation through the interference connection between the first section of the insertion shaft and the filter plate, and realizes the secondary fixation through the bolts, and the insertion shaft maintains in interference fit with the filter plate, so as to ensure the accurate alignment and mount of the handles on the two sides of the filter plate.

BRIEF DESCRIPTION OF THE DRAWINGS

For more clearly illustrating embodiments of the present application or technical solutions in the conventional technology, the drawing referred to for describing the embodiments or the conventional technology will be briefly described hereinafter. Apparently, the drawings in the following description are only some examples of the present application, and for those skilled in the art, other drawings may be obtained based on the provided drawing without any creative efforts.

Figure 1:
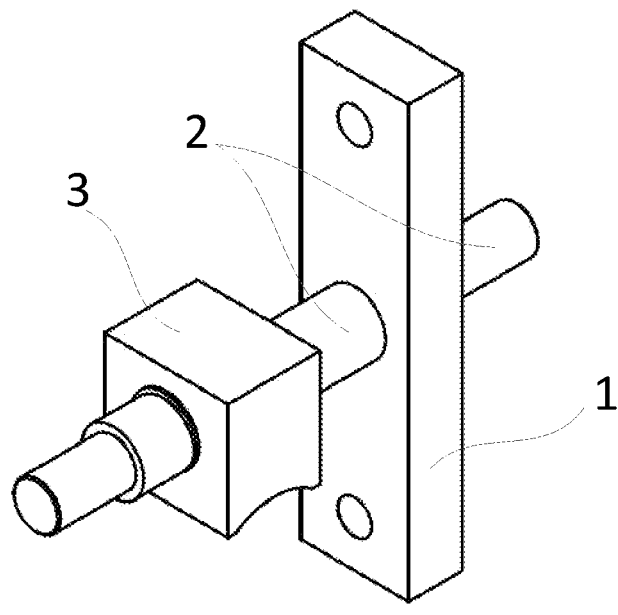
FIG. 1 is an axonometric view of a specific embodiment of a filter plate handle according to the present disclosure.

Reference numerals are as follows:

1, fixed plate; 2, insertion shaft;

21, first stepped section; 22, second stepped section;

23, third stepped section; 24, groove;

25, main body section; 3, wear-resistant block;

4, retaining ring.

DETAILED DESCRIPTION OF THE EMBODIMENTS

A core according to the present disclosure is to provide a filter plate handle, which adopts double fixation to increase stability and realizes accurate alignment with waist by interference fit.

In order to enable those skilled in the art to better understand the technical solution of the present disclosure, the filter plate handle according to the present disclosure will be further described in detail in combination with the drawings and specific embodiments.

Referring to FIGS. 1 to 5, a filter plate handle is provided according to the present disclosure, which includes a fixed plate 1 and an insertion shaft 2 which are relatively fixed, the fixed plate 1 and the insertion shaft 2 are kept as a whole during use, and there is not relative waggling and displacement there between. The insertion shaft 2 protrudes out of two side plate surfaces of the fixed plate 1, respectively, to form two protruding-out portion, which are configured as a first section and a second section, respectively; the insertion shaft 2 may be in an integrated structure or configured into a two-section split structure, and the two sections are fixed to the fixed plate 1 by welding in case of the two-section split structure.

Figure 2:
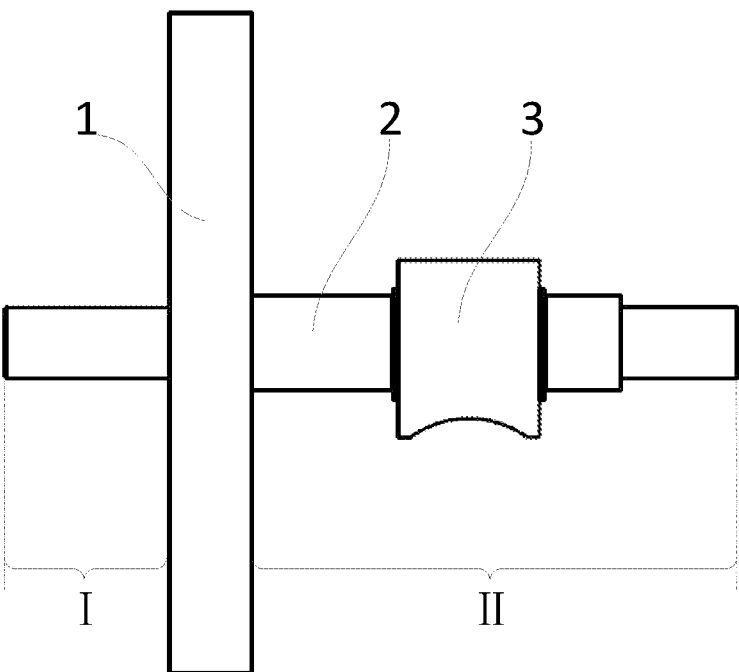
FIG. 2 is a front view of the specific embodiment of the filter plate handle according to the present disclosure.
Figure 3:
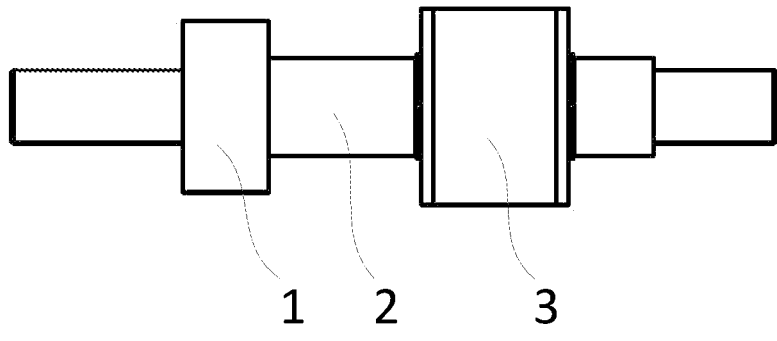
FIG. 3 is a top view of the specific embodiment of the filter plate handle according to the present disclosure.
Figure 4:
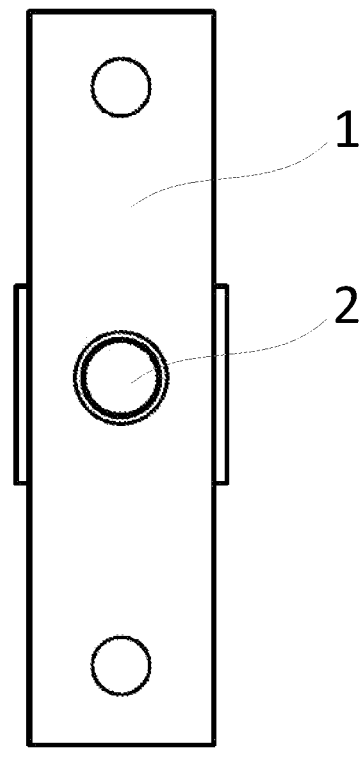
FIG. 4 is a left view of the specific embodiment of the filter plate handle according to the present disclosure.
Figure 5:
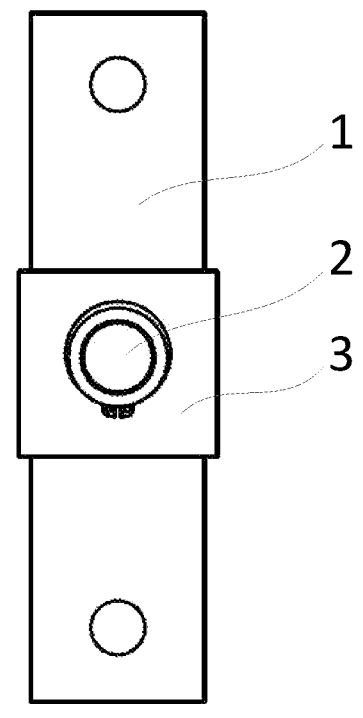
FIG. 5 is a right view of the specific embodiment of the filter plate handle according to the present disclosure.

In FIG. 2, "I" represents the first section, and "II" represents the second section. Combining with FIG. 7, the insertion shaft 2 according to the present disclosure is configured to be inserted into a filter plate (a structure of the filter plate is shown as A in FIG. 7), the first section of the insertion plate 2 is inserted into an insertion hole of the filter plate by interference fit and a second section extends away from the filter plate. The second section of the insertion shaft 2 is provided with a wear-resistant block 3, and the wear-resistant block 3 is configured to be in contact with a main beam (a structure of the main beam is not shown in the drawings), at least one filter plate handle is provided on two sides of the filter plate respectively, and the arrangement of at least two main beams, being arranged in parallel, is configured to support the filter plate handles, so as to provide support to the whole filter plate. A direction of the main beam is perpendicular to a direction of a plate surface of the filter plate, the filter plate handles protruding out of the left side and the right side of the filter plate are supported by two main beams, respectively, the wear-resistant block 3 is in contact with the main beam, and the filter plate is slidable along a length direction of the main beam; and multiple filter plates can be placed on the main beam.

Figure 7:
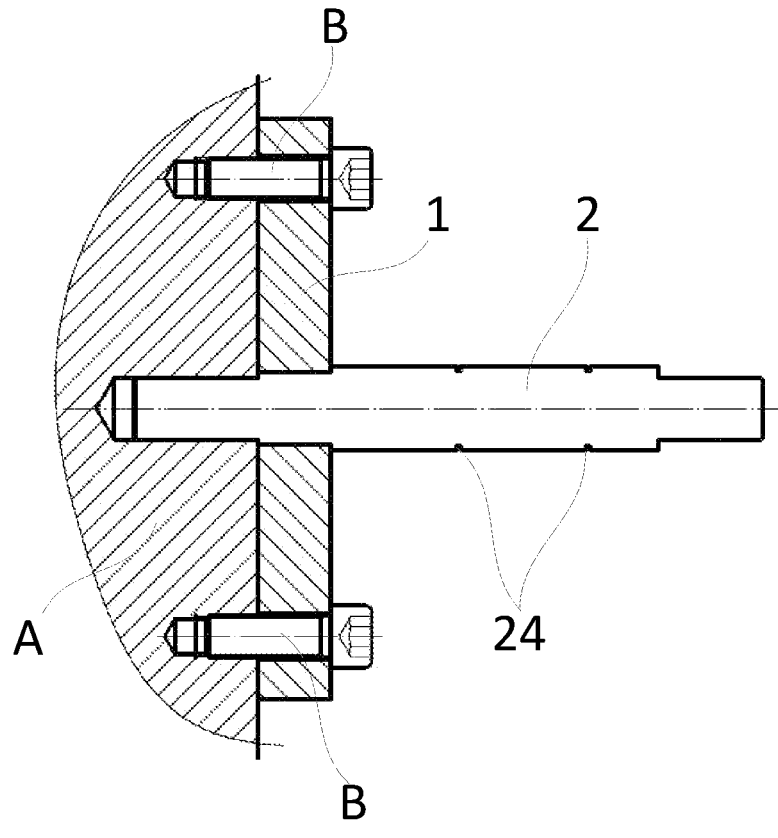
FIG. 7 is a front cross-sectional view of the specific embodiment of the filter plate handle according to the present disclosure mounted on a filter plate.

Referring to FIG. 1 and FIG. 7, at least two bolt holes are provided in the fixed plate 1, each of which is correspondingly mounted in each bolt hole, the fixed plate 1 is fixedly connected to the filter plate by at least two bolts. "B" in FIG. 7 represents the bolts. The bolt holes in the fixed plate 1 may be a smooth hole or a threaded hole with an internal thread, and corresponding threaded holes are provided in the filter plate, the bolts extend out after passing through the bolt hole in the fixed plate 1 and maintain in threaded connection with the threaded hole in the filter plate, so as to achieve threaded fixation.

The filter plate handle according to the present disclosure realizes the primary fixation through interference fit with the first section of the insertion shaft 2, and realizes the secondary fixation through threaded connection with two bolts, so that the fixed connection between the whole filter plate handle and the filter plate is more steadier. In addition, the interference fit between the first section of the insertion shaft 2 and the filter plate is maintained according to the present disclosure, the first section of the insertion shaft 2 is used to form accurate positioning, so as to ensure that the handles on the two sides of the filter plate are accurately aligned and mounted, and that there is no relative waggling between the filter plate and the filter plate handle.

Figure 6:
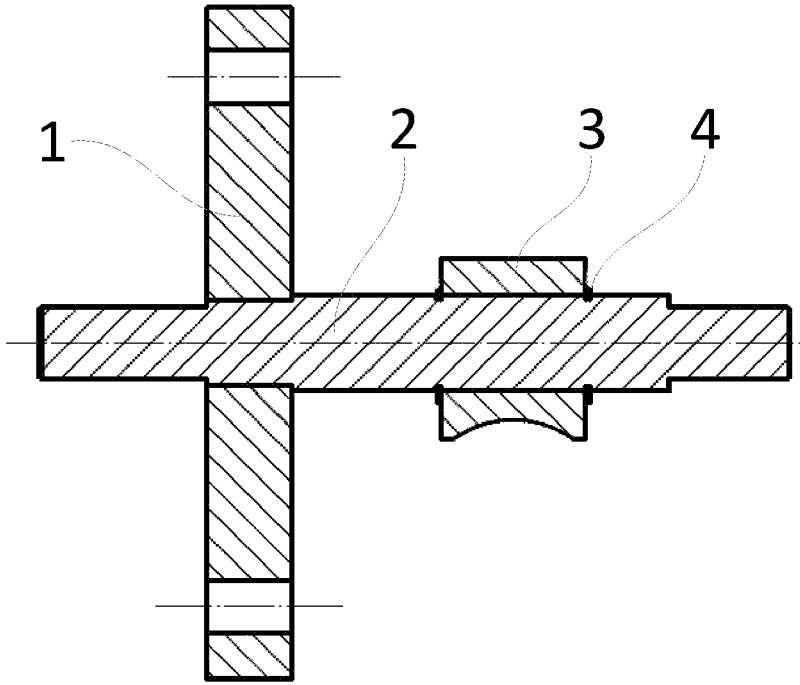
FIG. 6 is a front cross-sectional view of the specific embodiment of the filter plate handle according to the present disclosure.
Figure 8:
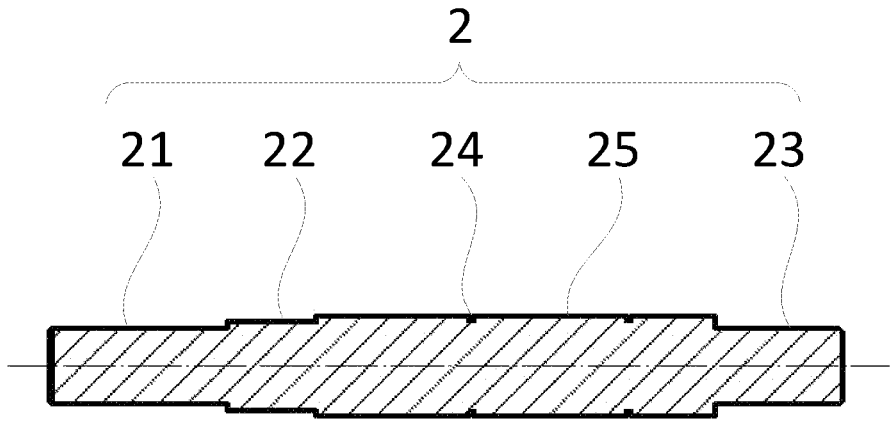
FIG. 8 is a cross-sectional view of an insertion shaft.

On the basis of the above solution, referring to FIG. 6, FIG. 7 and FIG. 8, the insertion shaft 2 according to the present disclosure is a stepped shaft. The outer diameter of the insertion shaft 2 is not identical along the whole insertion shaft, instead, the outer diameter decreases in a stepped shape from the middle to two ends, respectively, that is, the thickness in middle is greater and thickness of at two ends is less. The stepped sections mean that the outer diameters are abrupt changed, the outer diameter of each section is equal, thus forming a stepped surface with an abrupt change in size at a junction between the two stepped sections. In a preferred structure according to the present disclosure, the insertion shaft 2 is a complete shaft which penetrates through the fixed plate 1.

Referring to FIG. 8, the insertion shaft 2 according to the present disclosure is provided with a first stepped section 21 and a second stepped section 22, an outer diameter of the first stepped section 21 is less than an outer diameter of the second stepped section 22, the second stepped section 22 is in inserting connection with the fixed plate 1 by interference fit, and the first stepped section 21 is inserted into the filter plate by interference fit. After the second stepped section 22 is connected to the fixed plate 1 by interference fit, it can be further secured by welding, so as to improve the integrity.

Furthermore, the insertion shaft 2 according to the present disclosure is provided with a third stepped shaft 23, the third stepped section 23 is configured to cooperate with a plate puller, and a portion between the third stepped section 23 and the second stepped section 22 is a main body section 25 of the insertion shaft 2. An outer diameter of the main body section 25 is the greatest, and the outer diameter of the main body section 25 is greater than the outer diameter of the third stepped section 23 and is greater than the outer diameter of the second stepped section 22. During manufacturing, the third stepped section 23 is hooked by the two plate pullers on the left side and the right side, and the whole filter plate is driven to move by pulling the two filter plate handles.

Since the third stepped section 23 is configured as a hook for the plate puller, a shape of the third stepped section 23 is not particularly limited, and the third stepped section 23 is in a shape of a cylinder or a cuboid.

On the basis of any one of the above technical solutions and their combination, the wear-resistant block 3 according to the present disclosure is hinged to the main body section 25 of the insertion shaft 2, and the main body section 25 has the greater outer diameter, higher support strength and is not easy to deform. An outer surface of the main body section 25 is a cylindrical surface, and the wear-resistant block 3 can be sleeved on the outer surface of the main body section 25.

At least two grooves 24 are provided on an outer circumference of the insertion shaft 2, each groove is an annular groove and is defined around the outer circumference of the insertion shaft 2, the two grooves 24 are located in the main body section 25, a retaining ring 4 is clamped on each groove 24, the retaining ring 4 is configured to limit the wear-resistant block 3 axially, and the wear-resistant block 3 is rotatable relative to the insertion shaft 2, but cannot move axially.

Specifically, the fixed plate 1 according to the present disclosure is a metal plate, and the insertion shaft 2 is a metal shaft, which are respectively made by finish machining, so as to ensure dimensional accuracy. Compared with the conventional structure made by injection molding, the structures of the two have higher structural strength.

A filter plate for a filter press is further provided according to the present disclosure, which includes the filter plate handle according to any one of the above, each filter plate for the filter press includes at least two filter plate handles which are located on two opposite sides respectively, and the filter plate for the filter press can achieve the above technical effects.

According to the above description of the disclosed embodiments, those skilled in the art can implement or practice the present application. Various modifications to these embodiments are apparent for those skilled in the art. The general principles defined in the present application may be implemented in other embodiments without departing from the spirit and scope of the present application. Therefore, the present application should not be limited to the embodiments disclosed herein, but has the widest scope in accordance to the principle and the novel features disclosed herein.

The invention claimed is:

1. A filter plate handle, comprising a fixed plate and an insertion shaft that are relatively fixed, wherein the insertion shaft protrudes out of two side plate surfaces of the fixed plate respectively, a first section of the insertion shaft is inserted into an insertion hole of a filter plate by interference fit; a second section of the insertion shaft is provided with a wear-resistant block, and the wear-resistant block is configured to be in contact with a main beam; and

the fixed plate is provided with at least two bolt holes and is fixedly connected to the filter plate by the at least two bolts, wherein the insertion shaft is a stepped shaft, and an outer diameter of the stepped shaft decreases in a stepped shape from the middle to two ends, respectively, wherein the insertion shaft comprises a first stepped section and a second stepped section, the second stepped section is in inserting connection with the fixed plate by interference fit, the first stepped section is inserted into the filter plate by interference fit.

2. The filter plate handle according to claim 1, wherein the insertion shaft comprises a third stepped section, the third stepped section is configured to cooperate with a plate puller.

3. The filter plate handle according to claim 2, wherein the third stepped section is in a shape of a cylinder or a cuboid.

4. The filter plate handle according to claim 1, wherein the wear-resistant block is hinged to a main body section of the insertion shaft.

5. The filter plate handle according to claim 4, wherein at least two grooves are provided in an outer circumference of the insertion shaft, a retaining ring is clamped in each groove, and the retaining ring is configured to limit the wear-resistant block axially.

6. The filter plate handle according to claim 4, wherein the fixed plate is a metal plate, the insertion shaft is a metal shaft.

7. A filter plate for a filter press, comprising the filter plate handle according to claim 1.

8. The filter plate handle according to claim 2, wherein the wear-resistant block is hinged to a main body section of the insertion shaft.

9. The filter plate handle according to claim 3, wherein the wear-resistant block is hinged to a main body section of the insertion shaft.

* * * * *